United States Patent
Hokazono et al.

(10) Patent No.: US 9,758,029 B2
(45) Date of Patent: Sep. 12, 2017

(54) BATTERY FRAME AND VEHICLE BATTERY MOUNTING STRUCTURE

(71) Applicant: TOYOTA JIDOSHA KABUSHIKI KAISHA, Toyota-shi, Aichi (JP)

(72) Inventors: Kiyoshi Hokazono, Toyota (JP); Koki Ikeda, Toyota (JP); Shinya Kamimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/103,101

(22) PCT Filed: Dec. 17, 2014

(86) PCT No.: PCT/JP2014/083419
§ 371 (c)(1),
(2) Date: Jun. 9, 2016

(87) PCT Pub. No.: WO2015/098652
PCT Pub. Date: Jul. 2, 2015

(65) Prior Publication Data
US 2016/0375750 A1  Dec. 29, 2016

(30) Foreign Application Priority Data
Dec. 25, 2013 (JP) ................... 2013-267970

(51) Int. Cl.
*B60K 1/04* (2006.01)
*B62D 21/15* (2006.01)
*B62D 25/20* (2006.01)
*B62D 29/00* (2006.01)

(52) U.S. Cl.
CPC ............ *B60K 1/04* (2013.01); *B62D 25/2036* (2013.01); *B60K 2001/0438* (2013.01); *B60Y 2306/01* (2013.01); *B62D 21/157* (2013.01); *B62D 25/20* (2013.01); *B62D 29/005* (2013.01)

(58) Field of Classification Search
CPC .............. B60K 1/04; B60K 2001/0405; B60K 2001/0411; B60K 2001/0422; B60K 2001/0427; B60K 2001/0433; B60K 2001/0438; B62D 25/20; B62D 25/2035;
(Continued)

(56) References Cited
U.S. PATENT DOCUMENTS 6,040,080 A    3/2000  Minami et al.
7,896,115 B2 * 3/2011  Ono .................. B60K 1/04
                                              180/65.31
(Continued)

FOREIGN PATENT DOCUMENTS

JP   H07-246845 A   9/1995
JP   H10-6785 A     1/1998
(Continued)

*Primary Examiner* — John Walters
(74) *Attorney, Agent, or Firm* — Oliff PLC

(57) ABSTRACT

A battery frame including: a battery frame main body made of resin that is disposed at a vehicle body lower side of a floor panel and that supports a battery; and a ductile member made of metal that is integrally provided to the battery frame main body, that is fastened and fixed to a lower face side of the floor panel, and to which the battery is fastened and fixed.

12 Claims, 5 Drawing Sheets

(58) Field of Classification Search
CPC ... B62D 21/157; B62D 29/005; B62D 25/2036;
B60Y 2306/01
USPC ............................................. 180/68.5
See application file for complete search history.

(56) References Cited

U.S. PATENT DOCUMENTS

| | | | |
|---|---|---|---|
| 9,034,502 B2* | 5/2015 | Kano | B60K 1/04 |
| | | | 429/99 |
| 9,056,631 B2* | 6/2015 | Nakamori | B60K 1/04 |
| 9,077,019 B2* | 7/2015 | Kosaki | H01G 9/155 |
| 9,263,896 B2* | 2/2016 | Kinjo | H02M 3/1588 |
| 9,283,838 B2* | 3/2016 | Ohashi | B60K 1/04 |
| 2007/0007060 A1 | 1/2007 | Ono et al. | |
| 2011/0143179 A1 | 6/2011 | Nakamori | |
| 2012/0021301 A1 | 1/2012 | Ohashi | |
| 2012/0251862 A1 | 10/2012 | Kano et al. | |
| 2013/0202936 A1 | 8/2013 | Kosaki et al. | |
| 2015/0343971 A1* | 12/2015 | Ikeda | B60K 1/04 |
| | | | 429/100 |

FOREIGN PATENT DOCUMENTS

| | | |
|---|---|---|
| JP | 3606415 B2 | 1/2005 |
| JP | 2007-039004 A | 2/2007 |
| JP | 2011-124101 A | 6/2011 |
| JP | 2012-054054 A | 3/2012 |
| JP | 2012-214065 A | 11/2012 |
| WO | 2010/137150 A1 | 12/2010 |

* cited by examiner

BATTERY FRAME AND VEHICLE BATTERY MOUNTING STRUCTURE

TECHNICAL FIELD

The present invention relates to a battery frame and a vehicle battery mounting structure including the battery frame.

BACKGROUND ART

Structures are hitherto known in which a battery frame supporting a drive battery (battery) disposed at the lower side of a floor section of an electric vehicle is molded in fiber reinforced plastic (FRP) material, and fixed to side frames (sides of the vehicle body) disposed at the left and right of a lower face of the floor section (see, for example, Japanese Patent No. 3606415).

SUMMARY OF INVENTION

Technical Problem

However, the drive battery is supported by the side frames through a fastening portion of the battery frame made of resin. Thus, when collision load has been input to the battery frame in a vehicle collision, there is a possibility of cracks (breaks) occurring in the fastening portion of the battery frame, and a possibility of the battery frame (the drive battery) coming off the side frames (the vehicle). There is accordingly room for improvement of such structures with respect to suppressing the drive battery from coming off the vehicle when collision load has been input to the battery frame (the vehicle).

An object of the present invention is to obtain a battery frame capable of suppressing a battery from coming off a vehicle even when load is input to the vehicle, and a vehicle battery mounting structure equipped with the battery frame.

Solution to Problem

In order to achieve the above object, a battery frame of a first aspect according to the present invention includes a battery frame main body made of resin that is disposed at a vehicle body lower side of a floor panel and that supports a battery, and a ductile member made of metal, the ductile member being integrally provided to the battery frame main body, being fastened and fixed to a lower face side of the floor panel, and having the battery fastened and fixed thereto.

In the first aspect according to the present invention, the ductile member, which is made of metal and integrally provided to the battery frame main body made of resin, is fastened and fixed to the lower face side of the floor panel. The battery is fastened and fixed to the ductile member. Thus, the battery frame is suppressed from coming off the floor panel and the battery is suppressed from coming off the battery frame by the ductile member, even when load is input to the vehicle. Namely, the present invention suppresses the battery from coming off the vehicle, even when load is input to the vehicle.

A battery frame of a second aspect according to the present invention is the battery frame of the first aspect, wherein the ductile member is formed in a ring shape surrounding at least part of the battery frame main body.

In the second aspect according to the present invention, the ductile member is formed in a ring shape surrounding at least part of the battery frame main body. Thus, even when load is input to the ductile member from one side, the load is received and flows toward the other sides of the ductile member, and is suppressed from being transmitted toward the battery frame main body. Damage is thereby suppressed or prevented from occurring in the battery frame main body, and the battery is suppressed or prevented from coming off the battery frame.

A battery frame of a third aspect according to the present invention is the battery frame of the first aspect, wherein the battery frame main body includes an upper frame configuring an apex portion, a lower frame configuring a bottom portion, and an intermediate member provided between the upper frame and the lower frame. The ductile member is also formed in a ring shape surrounding at least the intermediate member.

In the third aspect according to the present invention, the ductile member is formed in a ring shape surrounding at least the intermediate member. Thus even when load is input to the ductile member from one side, the load is received and flows toward the other sides of the ductile member, and is suppressed from being transmitted toward the intermediate member. Damage is thereby suppressed or prevented from occurring in the intermediate member, and the battery is suppressed or prevented from coming off the battery frame.

A battery frame of a fourth aspect according to the present invention is the battery frame of the third aspect, wherein the intermediate member is formed with an undulating shaped cross-section as viewed from a vehicle width direction.

In the fourth aspect according to the present invention, the intermediate member is formed with an undulating shaped cross-section as viewed from the vehicle width direction. Thus, even when load is input to the ductile member and the battery frame main body from the vehicle width direction, the load is absorbed by the intermediate member.

A battery frame of a fifth aspect according to the present invention is the battery frame of any one of the first to the fourth aspects, wherein a cross member that extends along a vehicle width direction of the ductile member is formed with a substantially hat shaped cross-section.

In the fifth aspect according to the present invention, the cross member that extends along the vehicle width direction of the ductile member is formed with a substantially hat shaped cross-section. Thus, when load has been input to the ductile member from the vehicle width direction, the load is absorbed by the cross member, and is suppressed from being transmitted toward the battery frame main body. Damage is thereby suppressed or prevented from occurring in the battery frame main body, and the battery is suppressed or prevented from coming off the battery frame.

A battery frame of a sixth aspect according to the present invention is the battery frame of any one of the first to the fifth aspects, wherein a fastening portion of the ductile member to which the battery is fastened and fixed is configured by an inside fastening portion that juts out toward the battery frame main body side in plan view.

In the sixth aspect according to the present invention, the fastening portion of the ductile member to which the battery is fastened and fixed is configured by the inside fastening portion that juts out toward the battery frame main body side in plan view. Thus, even when load is input to the ductile member, the load is suppressed from being directly transmitted toward the inside fastening portion of the battery. The battery is thereby suppressed or prevented from coming off the battery frame.

A battery frame of a seventh aspect according to the present invention is the battery frame of any one of the first to the fifth aspects, wherein a fastening portion of the ductile member to which the battery is fastened and fixed is configured by an outside fastening portion that juts out toward the opposite side to the battery frame main body side in plan view.

In the seventh aspect according to the present invention, the fastening portion of the ductile member to which the battery is fastened and fixed is configured by the outside fastening portion that juts out toward the opposite side to the battery frame main body side in plan view. Thus, even when load is input to the ductile member, the load is suppressed from being directly transmitted toward the outside fastening portion of the battery. The battery is thereby suppressed or prevented from coming off the battery frame.

A battery frame of an eighth aspect according to the present invention is the battery frame of any one of the first to the fifth aspects, wherein plural fastening portions are provided to the ductile member to which the battery is fastened and fixed, at least one of the fastening portions is configured by an inside fastening portion that juts out toward the battery frame main body side in plan view, and at least one of the remaining fastening portions is configured by an outside fastening portion that juts out toward the opposite side to the battery frame main body side in plan view.

In the eighth aspect according to the present invention, the plural fastening portions are provided to the ductile member to which the battery is fastened and fixed, at least one of the fastening portions is configured by the inside fastening portion that juts out toward the battery frame main body side in plan view, and at least one of the remaining fastening portions is configured by the outside fastening portion that juts out toward the opposite side to the battery frame main body side in plan view. Thus, even when load is input to the ductile member, the load is suppressed from being directly transmitted toward the inside fastening portion or the outside fastening portion of the battery. The battery is thereby suppressed or prevented from coming off the battery frame.

A battery frame of a ninth aspect according to the present invention is the battery frame of any one of the first to the eighth aspects, wherein the ductile member includes an upper portion ductile member and a lower portion ductile member, and a flange portion configured by superimposing part of the upper portion ductile member and part of the lower portion ductile member on each other is fastened and fixed to the lower face side of the floor panel.

In the ninth aspect according to the present invention, the flange portion configured by superimposing part of the upper portion ductile member and part of the lower portion ductile member on each other is fastened and fixed to the lower face side of the floor panel. Thus, even when load is input to the flange portion through the floor panel, cracks and breaks are suppressed or prevented from occurring in the flange portion. The battery frame is thereby suppressed or prevented from coming off the floor panel.

A battery frame of a tenth aspect according to the present invention is the battery frame of any one of the first to the ninth aspects, wherein the battery frame main body is molded in a fiber reinforced plastic material, and the ductile member is formed of steel sheet.

In the tenth aspect according to the present invention, the battery frame main body is molded in a fiber reinforced plastic material, and the ductile member is formed of steel sheet. A reduction in weight is thereby achieved, while maintaining the strength (rigidity) as a battery frame.

A vehicle battery mounting structure of an eleventh aspect according to the present invention includes the battery frame of any one of the first to the tenth aspects, a battery that is fastened and fixed to the ductile member of the battery frame, and a floor panel having a lower face side to which the ductile member of the battery frame is fastened and fixed.

In the eleventh aspect according to the present invention, the ductile member made of metal that is integrally provided to the battery frame main body made of resin is fastened and fixed to the lower face side of the floor panel. The battery is fastened and fixed to the ductile member. Thus, the battery frame is suppressed from coming off the floor panel and the battery is suppressed from coming off the battery frame by the ductile member, even when load is input to the vehicle. Namely, the present invention suppresses the battery from coming off the vehicle, even when load is input to the vehicle.

A vehicle battery mounting structure of a twelfth aspect according to the present invention is the vehicle battery mounting structure of the eleventh aspect, wherein an energy absorption member is provided disposed at a vehicle width direction outside of the battery frame.

In the twelfth aspect according to the present invention, the energy absorption member is provided disposed at the vehicle width direction outside of the battery frame. Thus, part of a load that has been input to a side face of the vehicle is absorbed by the energy absorption member. Load transmitted to the battery frame is thereby reduced.

Advantageous Effects of Invention

As explained above, the first aspect according to the present invention enables the battery to be suppressed from coming off the vehicle, even when load is input to the vehicle.

The second aspect according to the present invention enables damage to be suppressed from occurring in the battery frame main body, and enables the battery to be suppressed from coming off the battery frame, even when load is input to the ductile member.

The third aspect according to the present invention enables damage to be suppressed from occurring in the intermediate member, and enables the battery to be suppressed from coming off the battery frame, even when load is input to the ductile member.

The fourth aspect according to the present invention enables load to be absorbed by the intermediate member, even when the load is input to the ductile member and the battery frame main body.

The fifth aspect according to the present invention enables damage to be suppressed from occurring in the battery frame main body, and enables the battery to be suppressed from coming off the battery frame, even when load is input to the ductile member.

The sixth aspect according to the present invention enables the battery to be suppressed from coming off the battery frame, even when load is input to the ductile member.

The seventh aspect according to the present invention enables the battery to be suppressed from coming off the battery frame, even when load is input to the ductile member.

The eighth aspect according to the present invention enables the battery to be suppressed from coming off the battery frame, even when load is input to the ductile member.

The ninth aspect according to the present invention enables cracks and breaks to be suppressed from occurring in the flange portion, and enables the battery frame to be suppressed from coming off the floor panel, even when load is input to the flange portion, this being part of the ductile member.

The tenth aspect according to the present invention enables a reduction in weight to be achieved, while maintaining the strength (rigidity) as a battery frame.

The eleventh aspect according to the present invention enables the battery to be suppressed from coming off the vehicle, even when load is input to the vehicle.

The twelfth aspect according to the present invention enables load transmitted to the battery frame to be reduced.

DESCRIPTION OF EMBODIMENTS

Detailed explanation follows regarding an exemplary embodiment according to the present invention, based on the drawings. Note that for ease of explanation, in each of the drawings as appropriate, the arrow UP indicates the vehicle body upper direction, the arrow FR indicates the vehicle body front direction, and the arrow OUT indicates the vehicle width direction outside. In the below explanation, unless specifically stated otherwise, reference to the up-down, front-rear, and left-right directions refers to up and down in the vehicle body up-down direction, front and rear in the vehicle body front-rear direction, and left and right in the vehicle body left-right direction (vehicle width direction).

Figure 1:
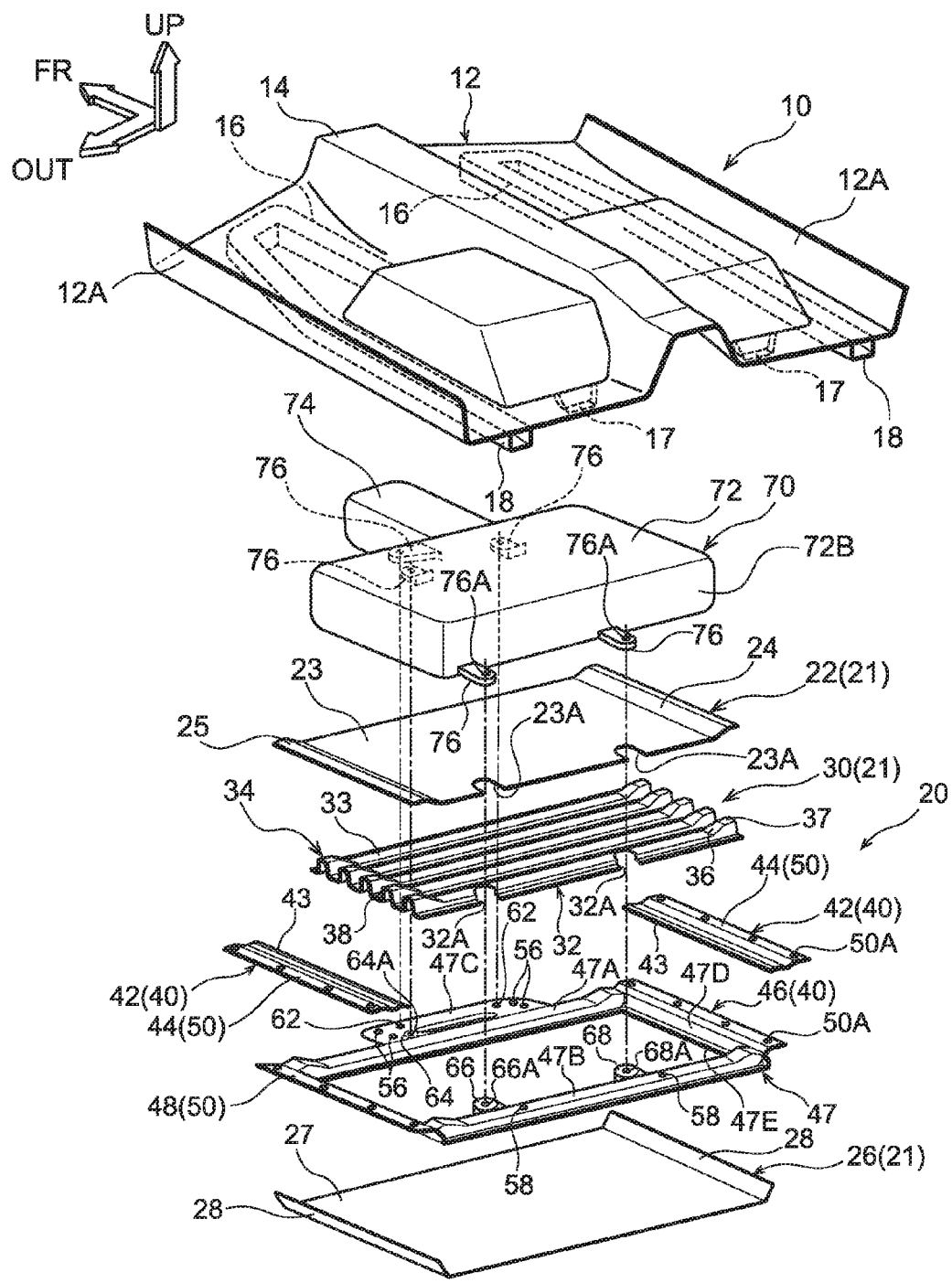
FIG. 1 is an exploded perspective view illustrating a vehicle battery mounting structure according to an exemplary embodiment.
Figure 2:
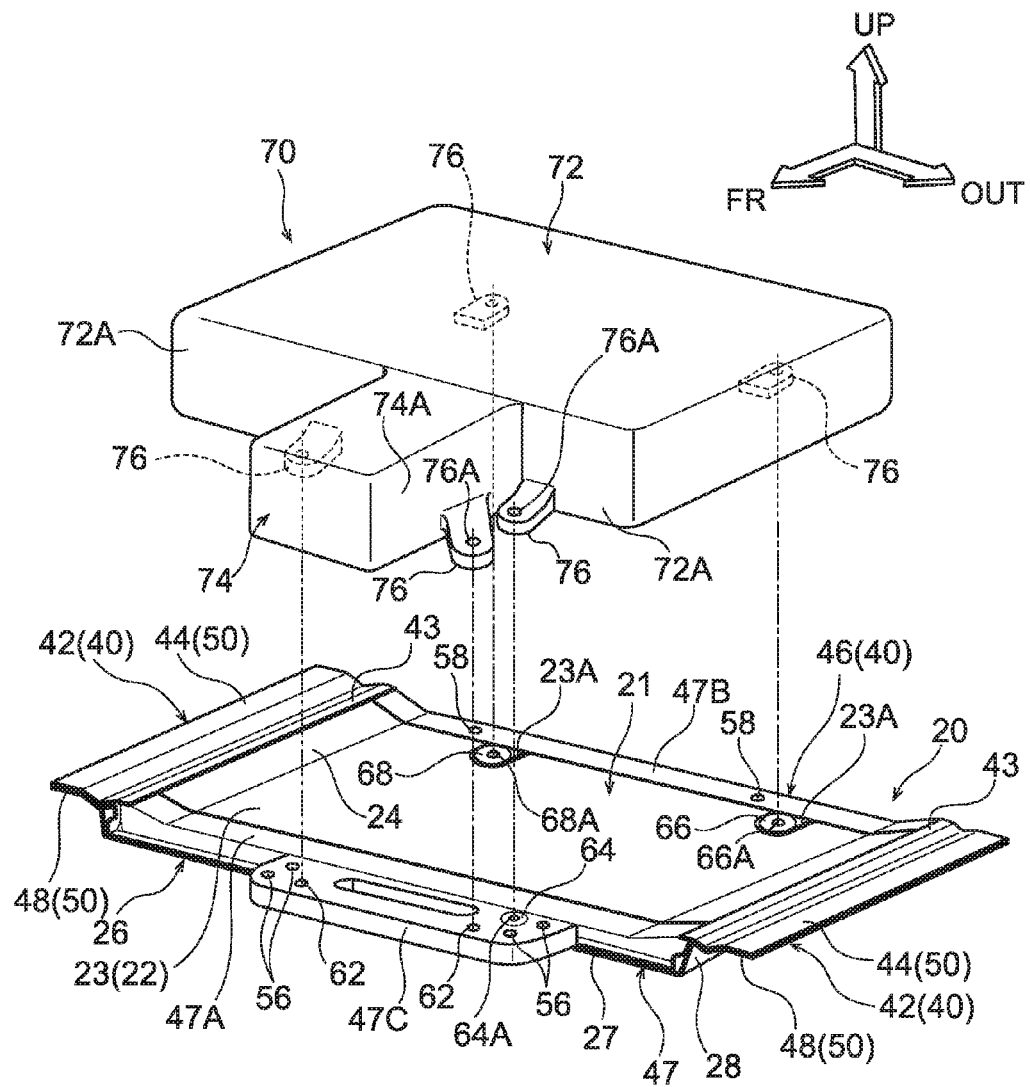
FIG. 2 is a perspective view illustrating a fuel cell stack and a battery frame according to the present exemplary embodiment.

As illustrated in FIG. 1 and FIG. 2, a vehicle battery mounting structure 10 according to the present exemplary embodiment applied to a vehicle such as an electric vehicle includes a floor panel 12 made of metal and configuring a floor (vehicle body) of a vehicle, a battery frame (stack frame) 20 that is fastened and fixed to the floor panel 12, and a fuel cell stack 70 serving as a battery that is fastened and fixed to the battery frame 20.

As illustrated in FIG. 1, a vehicle width direction center section of the floor panel 12 includes a tunnel section 14 formed in a protruding shape toward the vehicle body upper side and extending along the vehicle body front-rear direction. A left and right pair of under members 16 made of metal, which extend in the vehicle body front-rear direction along approximately half the length of the vehicle body front-rear direction length of the floor panel 12 and each have a substantially hat shaped cross-section, are provided to a lower face at the vehicle body front side of the floor panel 12, on both left and right sides of the tunnel section 14.

A left and right pair of under members 18 made of metal, which extend in the vehicle body front-rear direction along substantially the entire vehicle body front-rear direction length of the floor panel 12 and each have a substantially hat shaped cross-section, are provided to the lower face of the floor panel 12 at the vehicle width direction outsides of the respective under members 16. A left and right pair of under brackets 17 made of metal, which each have a substantially hat shaped cross-section, are provided to the lower face at vehicle body rear side end portions of the floor panel 12, at the vehicle width direction inside of the respective under members 18.

To explain in detail, flange portions (not illustrated in the drawings), these being upper end portions of the under members 16, flange portions 18A (see FIG. 4), these being upper end portions of the under members 18, and flange portions 17A (see FIG. 4 and FIG. 5), these being upper end portions of the under brackets 17, are each joined and fixed by spot welding or the like to the lower face of the floor panel 12. Note that the under members 18 are attached near to vehicle width direction outside end portions (bent portions 12A, described later) of the floor panel 12.

Figure 4:
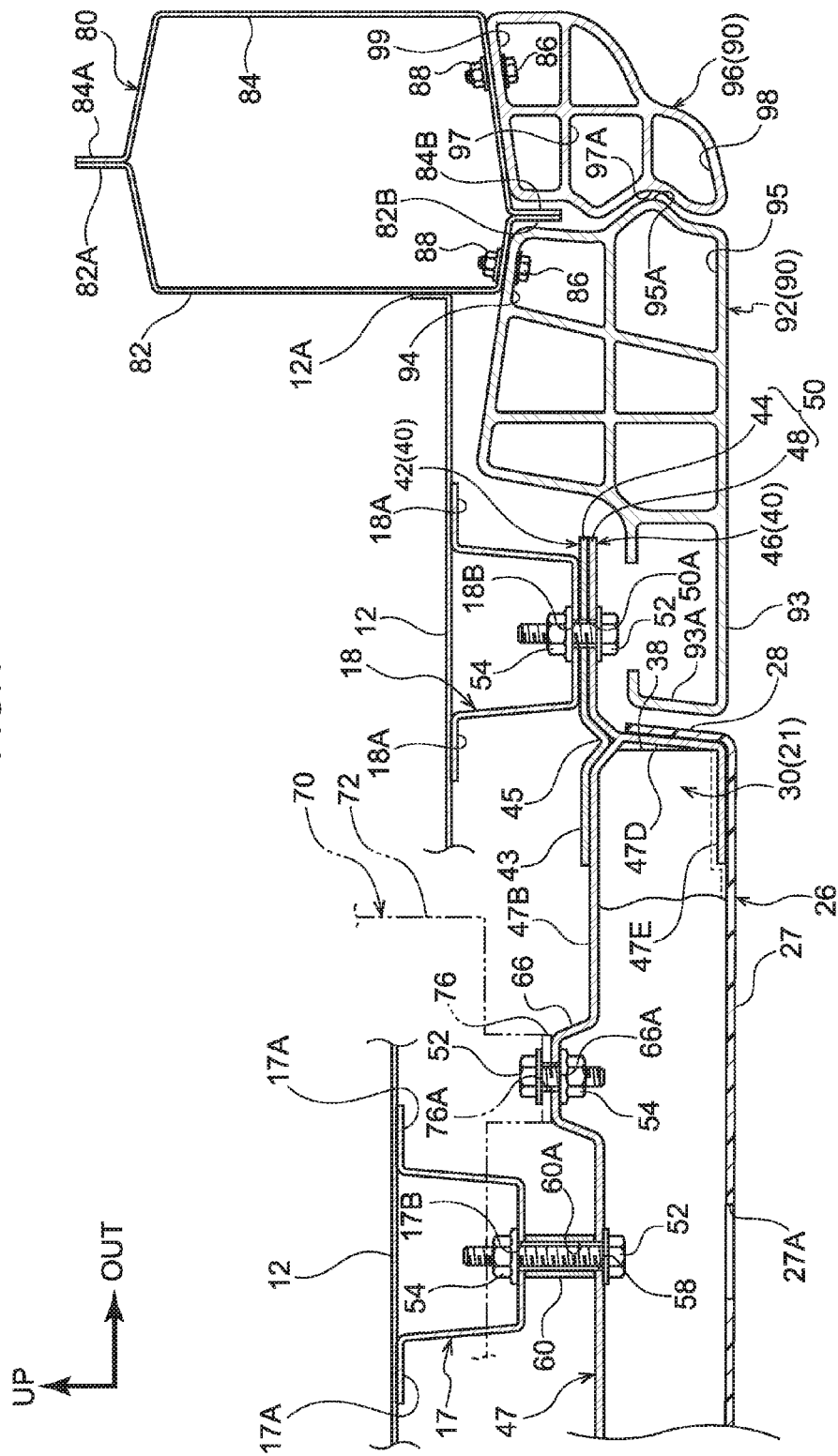
FIG. 4 is a cross-section view along arrow line X-X in FIG. 3, illustrated together with a rocker and a lower face side of a floor panel (including an energy absorption member).
Figure 5:
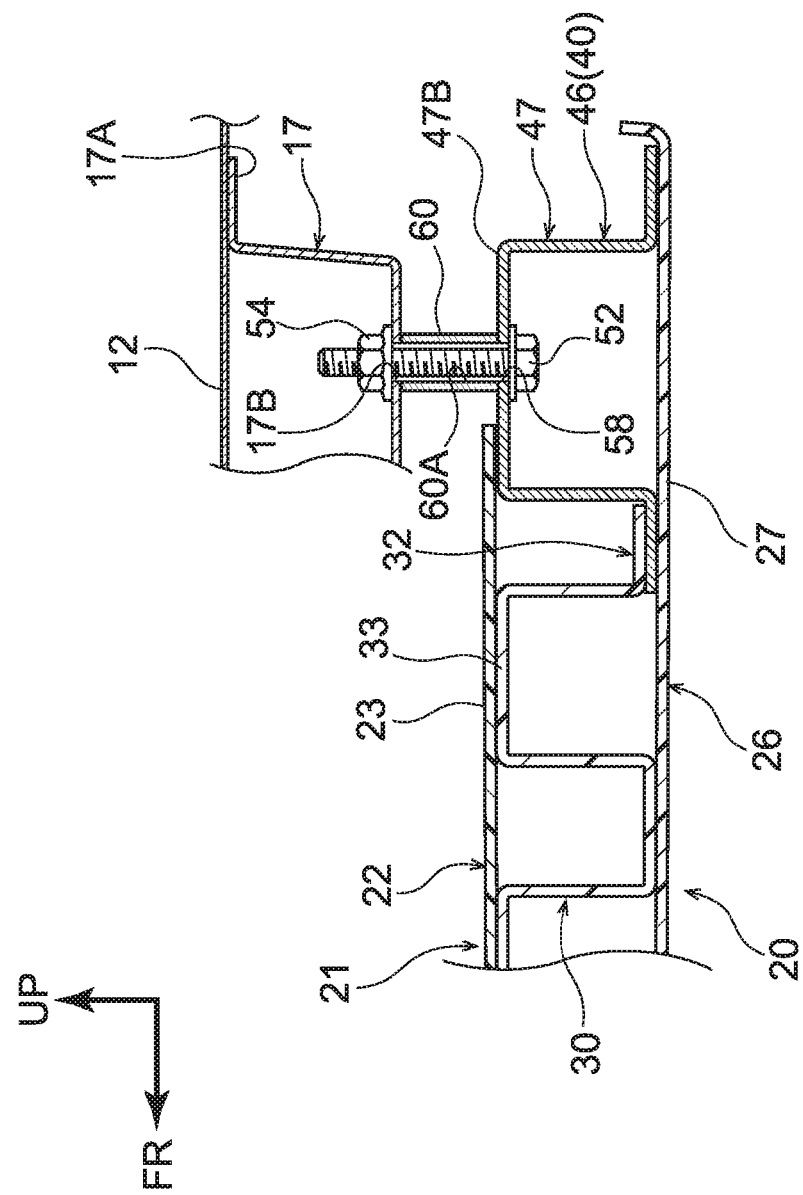
FIG. 5 is a cross-section view along arrow line Y-Y in FIG. 3, illustrated together with a lower face side of a floor panel.

Plural through-holes (not illustrated in the drawings) for inserting flange bolts 52 illustrated in FIG. 4 and FIG. 5 are formed in each under member 16, and a weld nut (not illustrated in the drawings) is provided coaxially to each through-hole. Similarly, plural through-holes 18B for inserting flange bolts 52 are formed in each under member 18, and a weld nut 54 is provided coaxially to each through-hole 18B (see FIG. 4).

As illustrated in FIG. 4 and FIG. 5, one through-hole 17B for inserting a flange bolt 52 is formed in each under bracket 17, and a weld nut 54 is provided coaxially to the respective through-hole 17B. Note that circular tube shaped collar members 60 made of metal are attached by welding or the like to a rear cross member 47B, described later, in order to adjust the height of the under brackets 17.

Figure 3:
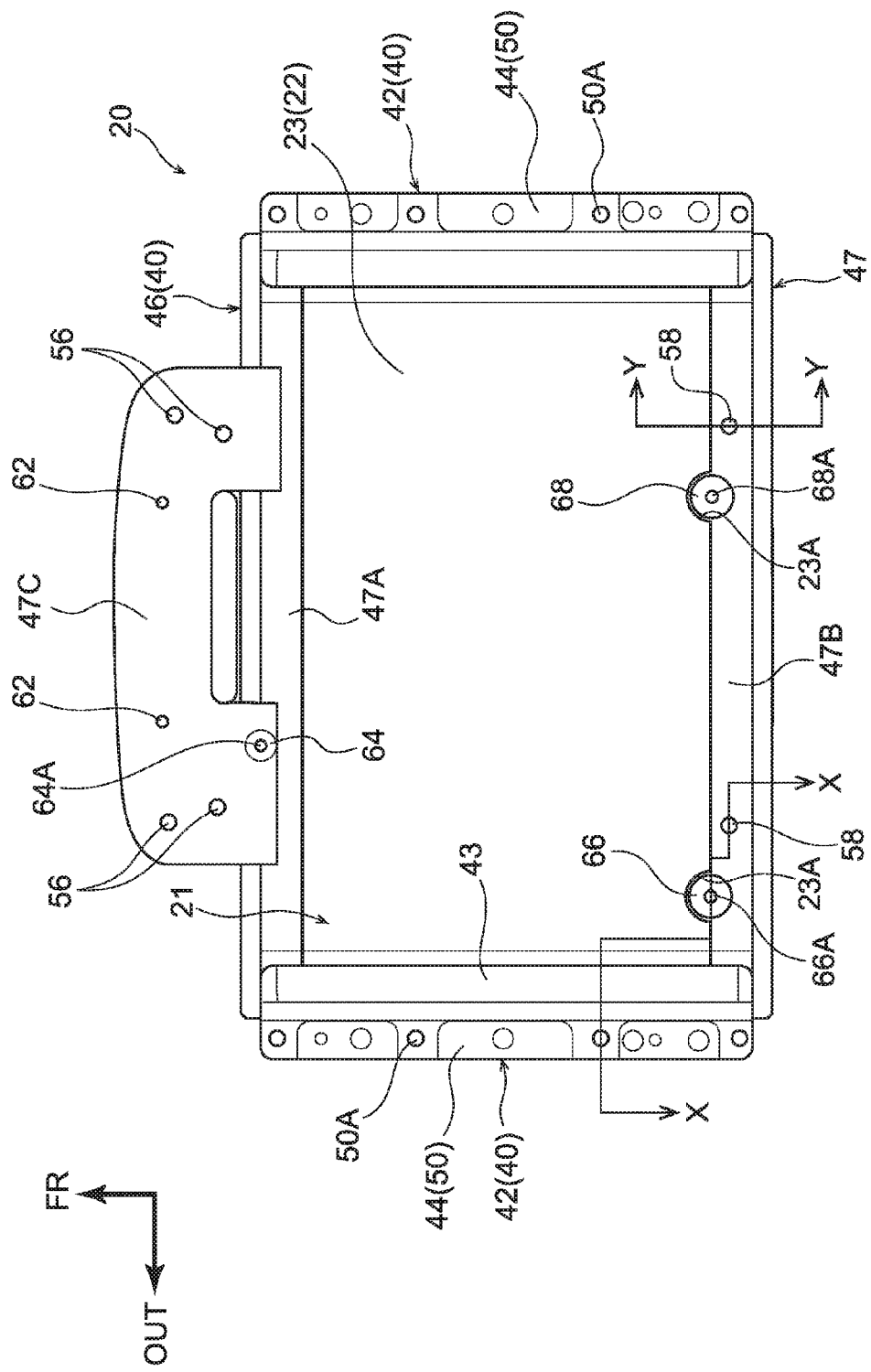
FIG. 3 is a plan view of a battery frame according to the present exemplary embodiment.

As illustrated in FIG. 1 to FIG. 3, the battery frame 20 includes a battery frame main body 21 made of fiber reinforced plastic (FRP) and molded in carbon fiber reinforced plastic (CFRP) as an example, and a ductile member 40 made of metal and made of high tensile steel sheet or ultra-high tensile steel sheet as an example.

To explain in detail, the battery frame main body 21 is configured including a substantially flat plate shaped upper frame 22 configuring an apex section, a substantially tray shaped lower frame 26 configuring a bottom section, and a core frame 30 serving as an intermediate member (reinforcing member) provided between the upper frame 22 and the lower frame 26.

The upper frame 22 includes a flat rectangular plate shaped top plate 23 disposed along the horizontal direction, flat rectangular plate shaped sloped walls 24, which are integrally and continuously provided sloping toward the vehicle width direction upper outsides so as to follow sloped walls 36, described later, at either vehicle width direction end portion (outside end portion) of the top plate 23, and flat rectangular plate shaped flange portions 25, which are integrally and continuously provided substantially horizontally toward the vehicle width direction outsides so as to follow upper walls 37, described later, at a vehicle width direction end portion of either sloped wall 24. Note that two circular arc shaped cutout portions 23A are formed to a vehicle body rear side end portion of the top plate 23 in order to avoid fastening portions 66, 68, described later.

The lower frame 26 includes a flat rectangular plate shaped bottom plate 27 disposed along the horizontal direction, and flat rectangular plate shaped side wall portions 28, which are integrally provided standing substantially perpendicular toward the vehicle body upper side, specifically, sloping slightly toward the vehicle body upper outside as viewed from the vehicle body front-rear direction illustrated in FIG. 4, at either vehicle width direction end portion (outside end portion) of the bottom plate 27. Note that the height of the side wall portions 28 is substantially the same as the height of side wall portions 47D of a lower main body portion 47 of a lower portion ductile member 46, described later.

The core frame 30 includes a main body portion 32 (formed in a corrugated shape with an undulating shaped cross-section as viewed from the vehicle width direction) formed by protruding portions 33 with substantially hat shaped cross-sections extending along the vehicle width direction in plural rows (five rows, for example) in the vehicle body front-rear direction, and projecting portions 34, which are formed so as to project out toward the vehicle body upper side continuously from upper faces of the protruding portions 33, at either vehicle width direction end portion of the main body portion 32.

The sloped walls 36 are integrally and continuously provided sloping toward the vehicle width direction upper outsides from the upper faces of the protruding portions 33 at the vehicle width direction inside of the projecting portions 34. The upper walls 37 are integrally and continuously provided substantially horizontally toward the vehicle width direction outsides at upper end portions of the sloped walls 36. End face portions 38, each with a substantially perpendicular cross-section with respect to the main body portion 32, are configured at vehicle width direction outside end portions of the projecting portions 34. Note that two circular arc shaped cutout portions 32A are formed in a vehicle body rear side end portion of the main body portion 32 in order to avoid the fastening portions 66, 68, described later.

The ductile member 40 includes upper portion ductile members 42 with their length direction along the vehicle body front-rear direction, and the substantially rectangular frame shaped (closed ring shaped) lower portion ductile member 46 with a front end center portion jutting out toward the vehicle body front side to match the shape of an external section 72, described later, of the fuel cell stack 70.

As illustrated in FIG. 1 to FIG. 4, each upper portion ductile member 42 includes an upper main body portion 43 and an upper flange portion 44 integrally and continuously provided at the vehicle width direction outside of the respective upper main body portion 43. The upper main body portions 43 and the upper flange portions 44 are each superimposed on the lower main body portion 47 and lower flange portions 48 of the lower portion ductile member 46, described later, and joined thereto by rivets or the like.

An indented portion 45 indented toward the vehicle body lower side as viewed from the vehicle body front-rear direction is formed at a boundary portion between each upper main body portion 43 and upper flange portion 44. The indented portion 45 configures a pivot point of folding deformation toward the vehicle width direction inside of the upper flange portion 44 and the lower flange portion 48 (a flange portion 50, described later) in a side-on collision of the vehicle.

As illustrated in FIG. 1 to FIG. 3, the lower portion ductile member 46 includes the rectangular frame shaped lower main body portion 47. A front cross member 47A with a substantially hat shaped cross-section profile extending along the vehicle width direction is configured at a front portion side of the lower main body portion 47, and the rear cross member 47B with a substantially hat shaped cross-section profile extending along the vehicle width direction is configured at a rear portion side of the lower main body portion 47. Note that the front cross member 47A and the rear cross member 47B are each a "cross member" of the present invention.

An extension portion 47C that is substantially U shaped in plan view is integrally and continuously provided with its circular arc shaped portion toward the vehicle body front side (the opposite side to the battery frame main body 21) at a front end center portion of the front cross member 47A. Plural (a total of four, with two each on the left and right, for example) hole portions 56 for fastening and fixing the battery frame 20 to the respective under members 16 of the floor panel 12 are respectively formed piercing through in rows along substantially the vehicle body front-rear direction at both left and right end portion sides of the extension portion 47C.

Plural (a total of two, with one each on the left and right, for example) hole portions 62 for fastening and fixing the fuel cell stack 70, and one fastening portion 64, are also formed piercing through specific positions of the extension portion 47C. To explain in detail, the hole portions 62 are formed on the left and right at the vehicle width direction inside of the hole portions 56 at the vehicle body front side, with a specific interval therebetween.

The fastening portion 64 is an outside fastening portion jutting out toward the opposite side to the battery frame main body 21 (the outside), and is formed in a slightly protruding shape toward the vehicle body upper side at the vehicle body rear side of the hole portion 62 on the left side. A hole portion 64A is formed piercing through a center portion of the fastening portion 64, and weld nuts (not illustrated in the drawings) are coaxially provided to the hole portions 62 and the hole portion 64A at a lower face of the extension portion 47C (fastening portion 64).

The two fastening portions 66, 68 for fastening and fixing the fuel cell stack 70 are integrally formed at a front end portion of the rear cross member 47B, with a specific interval in the vehicle width direction therebetween. Each of the fastening portions 66, 68 is an inside fastening portion jutting out toward the battery frame main body 21 side (inside), and is formed in a slightly protruding shape toward the vehicle body upper side. Hole portions 66A, 68A are respectively formed piercing through center portions of the respective fastening portions 66, 68, and the weld nuts 54 (see FIG. 4) are coaxially provided to the hole portions 66A, 68A at lower faces of the respective fastening portions 66, 68.

Plural (two in total, with one each on the left and right, for example) hole portions 58 for fastening and fixing the battery frame 20 to the respective under brackets 17 of the floor panel 12 are formed piercing through locations in close proximity to the respective fastening portions 66, 68, for example, at the right side of the respective fastening portions 66, 68, of the rear cross member 47B.

Through-holes 60A of the circular tube shaped collar members 60 made of metal are placed in communication with the respective hole portions 58 (coaxially to the respective hole portions 58) and attached to the rear cross member 47B by welding or the like (see FIG. 4 and FIG. 5). The length of the collar members 60 is substantially the same as an interval between the rear cross member 47B and the under brackets 17. Thus, the difference in height between the rear cross member 47B and the under brackets 17 is adjusted by the collar members 60.

As illustrated in FIG. 1, the side wall portions 47D extend along the vehicle body front-rear direction at either vehicle width direction end portion of the lower main body portion 47. The side wall portions 47D are formed substantially perpendicular toward the vehicle body upper side, specifically, sloping slightly toward the vehicle body upper outsides as viewed from the vehicle body front-rear direction as illustrated in FIG. 4, so as to follow the side wall portions 28 of the lower frame 26 (at the same slope angle as the side wall portions 28). Note that the height of the side wall portions 47D is substantially the same as the height of the side wall portions 28 of the lower frame 26.

Flat rectangular plate shaped jutting-out portions 47E that jut out toward the vehicle width direction inside are integrally and continuously provided at lower end portions of the respective side wall portions 47D. As described later, a lower face at the projecting portion 34 side of the main body portion 32 of the core frame 30 is joined by adhesive to upper faces of the jutting-out portions 47E. Namely, the jutting-out portions 47E of the lower main body portion 47 are clamped and fixed between the lower frame 26 and the core frame 30, and the side wall portions 47D of the lower main body portion 47 face the end face portions 38 of the core frame 30.

The lower flange portions 48 are integrally and continuously provided projecting out further toward the vehicle width direction outsides than the side wall portions 28 of the lower frame 26 (the battery frame main body 21) at vehicle width direction outside end portions of the side wall portions 47D. The upper flange portions 44 that are disposed further toward the vehicle width direction outsides than the side wall portions 28 of the lower frame 26 (the battery frame main body 21), are superimposed on the lower flange portions 48 from above and joined thereto by rivets or the like.

The flange portions 50, which form fixing locations to the respective under members 18 (the lower face side of the floor panel 12), are configured by the respective upper flange portions 44 and lower flange portions 48 being joined together. Namely, plural through-holes 50A for fastening and fixing the battery frame 20 to the respective under members 18 of the floor panel 12 are formed in rows in the vehicle body front-rear direction in the respective flange portions 50.

Thus, after the fuel cell stack 70, described later, has been fastened and fixed to the battery frame 20, the flange bolts 52 are inserted through the through-holes 50A and the through-holes 18B from the vehicle body lower side and screwed together with the weld nuts 54, thereby fastening and fixing the battery frame 20 to the under members 18. Flange bolts (not illustrated in the drawings) are then inserted through the hole portions 56 and through-holes (not illustrated in the drawings) from the vehicle body lower side and screwed together with weld nuts (not illustrated in the drawings), thereby fastening and fixing the battery frame 20 to the under members 16.

The flange bolts 52 are inserted through the hole portions 58, namely, the through-holes 60A of the collar members 60 and the through-holes 17B from the vehicle body lower side and screwed together with the weld nuts 54, thereby fastening and fixing the battery frame 20 to the under brackets 17. Note that through-holes 27A (see FIG. 4) for inserting the flange bolts 52 are formed in the bottom plate 27. The battery frame 20 is fastened and fixed to the lower face side of the floor panel 12 by only the ductile member 40 in this manner (see FIG. 4 and FIG. 5).

The battery frame 20 configured in this manner is assembled as described below. First, the lower main body portion 47 of the lower portion ductile member 46 is joined to an upper face of the bottom plate 27 of the lower frame 26 by adhesive, rivets, or the like. The core frame 30 is then disposed inside the lower main body portion 47, and the lower face of the main body portion 32 is joined to the upper face of the bottom plate 27 of the lower frame 26 by adhesive, rivets, or the like.

Note that the lower face at the projecting portion 34 side of the main body portion 32 is joined by adhesive to the upper faces of the jutting-out portions 47E, and the jutting-out portions 47E are clamped and fixed between the lower frame 26 and the core frame 30 when this is performed. A lower face of the top plate 23 of the upper frame 22 is then joined to the upper faces of the respective protruding portions 33 of the core frame 30 by adhesive, rivets, or the like, and the upper flange portions 44 of the upper portion ductile members 42 are joined to the lower flange portions 48 of the lower portion ductile member 46 by rivets or the like.

The battery frame 20 is thereby assembled with at least part of the battery frame main body 21, namely, the upper frame 22 and the core frame 30, disposed inside the ductile member 40 configured with a substantially rectangular frame shape (a closed ring shape) (surrounded from the outside by the ductile member 40 configured in a substantially rectangular frame shape). Namely, the battery frame 20 is efficiently manufactured with the fastening locations to the floor panel 12 and fastening locations to the fuel cell stack 70, described below, all on the ductile member 40 alone.

As illustrated in FIG. 1 and FIG. 2, the external section 72 of the fuel cell stack 70 is formed of metal (or may be resin) in a box shape forming a protruding shape in plan view. Leg portions 76 are integrally formed projecting out toward the outside at plural locations on a lower end peripheral portion of the external section 72.

To explain in detail, the leg portions 76 are respectively provided projecting out at a lower end portion of a left side wall 74A of a projecting portion 74 projecting out toward the vehicle body front side of the external section 72, lower end portions of front walls 72A of the external section 72 on both left and right sides of the projecting portion 74, and a lower end portion on both left and right sides of a rear wall 72B of the external section 72. Through-holes 76A for inserting the flange bolts 52 through are formed in the respective leg portions 76.

The fuel cell stack 70 is accordingly fastened and fixed to the battery frame 20 (ductile member 40) in the following manner. As illustrated in FIG. 2, the fuel cell stack 70 is mounted on an upper face of the battery frame main body 21 (top plate 23), and the respective leg portions 76 are disposed on the fastening portion 64 formed to the extension portion 47C, and on the respective fastening portions 66, 68 formed at the front end portion of the rear cross member 47B.

Thus, the through-holes 76A and the respective hole portions 64A, 66A, 68A are placed in communication with each other, and the through-holes 76A and the respective hole portions 62 are placed in communication with each other. Thus, as illustrated in FIG. 4, flange bolts 52 are inserted through the respective through-holes 76A and the respective hole portions 62, 64A, 66A, 68A from the vehicle body upper side and screwed together with the weld nuts 54, thereby fastening and fixing the fuel cell stack 70 to the battery frame 20, specifically, only the ductile member 40 (lower portion ductile member 46).

The fuel cell stack 70 according to the present exemplary embodiment has its center of gravity further toward the vehicle width direction left side than a vehicle width direction center portion. The respective fastening portions 64, 66, 68 of the battery frame 20 are thereby disposed further toward the vehicle width direction left side than the vehicle width direction center portion; however, configuration is not limited thereto. Namely, if the fuel cell stack 70 has its center of gravity at the vehicle width direction center portion, the respective fastening portions 64, 66, 68 may be disposed with left-right symmetry.

As illustrated in FIG. 4, the bent portion 12A is formed bending toward the vehicle body upper side at each vehicle width direction outside end portion of the floor panel 12. The bent portion 12A is joined by welding or the like to an inner panel 82 of a rocker 80 made of metal. The rocker 80 is configured including the inner panel 82 with a substantially hat shaped cross-section, and an outer panel 84 with a substantially hat shaped cross-section.

Namely, the rocker 80 is configured with a rectangular shaped closed cross-section profile, by joining an upper flange portion 84A of the outer panel 84 to an upper flange portion 82A of the inner panel 82 by welding or the like, and by joining a lower flange portion 84B of the outer panel 84 to a lower flange portion 82B of the inner panel 82 by welding or the like.

An energy absorption member 90 made of metal is disposed between the vehicle body lower side of the rocker 80 (including the respective vehicle width direction end portion of the floor panel 12) and the battery frame 20. The energy absorption member 90 is configured including an inner member 92 disposed at the vehicle width direction inside so as to be in close proximity to the side wall portion 28, and an outer member 96 disposed further toward the vehicle width direction outside than the inner member 92 by a specific gap (a gap of an amount enabling insertion of the lower flange portions 82B, 84B).

The inner member 92 is configured in a shape in which plural (seven, for example) block portions, each with a substantially rectangular closed cross-section profile (tube shape) extending along the vehicle body front-rear direction, have been combined together to form an integral unit. A side wall portion 93A facing the vehicle width direction inside of the block portion 93 that is furthest toward the vehicle width direction inside, is disposed in close proximity to the side wall portion 28.

To explain in detail, as viewed from the vehicle body front-rear direction (in face-on view), the side wall portion 93A of the block portion 93 is formed sloping (at the same slope angle as the side wall portion 28) slightly toward the vehicle body upper outside so as to be substantially parallel to the side wall portion 28, and is disposed facing the side wall portion 28 across a slight gap in the vehicle width direction. An upper end face of the side wall portion 93A and an upper end face of the side wall portion 28 are positioned at substantially the same height.

The block portion 93 is fastened and fixed by bolts and weld nuts, not illustrated in the drawings, to the respective under member 18, excluding a fastening location of the flange portion 50. A block portion 94 at an upper portion side furthest toward the vehicle width direction outside is fastened and fixed to the inner panel 82 of the rocker 80 by a bolt 86 and a weld nut 88. The inner members 92 are thereby disposed at the vehicle body lower side of either vehicle width direction end portion of the floor panel 12.

The outer member 96 is configured in a shape in which plural (five, for example) block portions, each with a substantially rectangular closed cross-section profile (tube shape) extending along the vehicle body front-rear direction, have been combined together to form an integral unit. A block portion 99 at an upper portion side at the vehicle width direction outside is fastened and fixed by a bolt 86 and a weld nut 88 to the outer panel 84 of the rocker 80. The outer member 96 is thereby disposed at the vehicle body lower side of the rocker 80.

A protruding portion 95A is formed projecting out toward the vehicle width direction outside of a block portion 95 at a lower portion side furthest toward the vehicle width direction outside of the inner member 92. An indented portion 97A, which is indented toward the vehicle width direction outside so as to admit the protruding portion 95A (such that there is no contact with the protruding portion 95A), is formed at a boundary portion between a block portion 97 and a block portion 98 at the lower portion side at the vehicle width direction inside of the outer member 96.

When the outer member 96 has moved toward the inner member 92 side due to a side-on collision of the vehicle, the indented portion 97A fits together with (contacts) the protruding portion 95A, thereby enabling part of the input collision load to be efficiently transmitted from the outer member 96 to the inner member 92. Namely, the outer member 96 and the inner member 92 are configured capable of undergoing plastic deformation (being squashed) toward the vehicle width direction inside as an integral unit.

Explanation follows regarding operation of the battery frame 20 and the vehicle battery mounting structure 10 configured as described above. Namely, explanation follows regarding operation in a case in which, for example, the vehicle has been in a side-on collision with a circular column shaped (or circular tube shaped) metal pole (not illustrated in the drawings) extending along the vertical direction.

In a side-on collision between the vehicle and the pole (obstacle), an excessive collision load toward the vehicle width direction inside is input to the rocker 80 and the energy absorption member 90. When the collision load is input to the rocker 80 and the energy absorption member 90 from the vehicle width direction outside, the rocker 80 and the energy absorption member 90 move while undergoing plastic deformation toward the vehicle width direction inside, absorb part of the input collision load, and transmit part of the remaining collision load toward the floor panel 12 (under member 18) and the battery frame 20 (flange portion 50).

When part of the collision load is transmitted to the floor panel 12, the respective vehicle width direction outside end portion of the floor panel 12 (the bent portion 12A) curls upward, and the vehicle width direction outside of the respective under member 18 fixed near the lower face of the vehicle width direction outside end portion of the floor panel 12 (the bent portion 12A) is moved toward the vehicle body upper side. A bending moment with its axial direction along the vehicle body front-rear direction is thereby input to the flange portion 50 of the ductile member 40 that is fastened and fixed to the under member 18.

Namely, an upward-folding force (such that a vehicle width direction outside end portion of the flange portion 50 is moved toward the vehicle body upper side) is applied to the flange portion 50 (the upper flange portion 44 and the lower flange portion 48) of the ductile member 40 fastened and fixed to the under member 18, with the indented portion 45 acting as a pivot point.

Note that the flange portion 50 (ductile member 40) is ductile, due to being formed of metal (high tensile steel sheet or ultra-high tensile steel sheet). Thus, the flange portion 50 readily undergoes folding deformation (plastic deformation) toward the vehicle body upper side about the pivot point of the indented portion 45. The bending moment input to the flange portion 50 is thereby efficiently absorbed by bending deformation of the flange portion 50 toward the vehicle body upper side, and is suppressed or prevented from being transmitted toward the battery frame main body 21.

Since the flange portion 50 is ductile, cracks and breaks are suppressed or prevented from occurring simply by making the flange portion 50 undergo folding deformation toward the vehicle body upper side. This enables the battery frame 20 to be suppressed or prevented from coming off the under member 18, and enables the fuel cell stack 70 to be suppressed or prevented from coming off the vehicle, even when bending moment is input to the flange portion 50.

When the respective under member 18 has moved toward the vehicle width direction inside accompanying part of the collision load being transmitted to the floor panel 12, part of the collision load is locally transmitted to one flange portion 50 through the flange bolts 52. Note that the flange portion 50 is configured by superimposing the upper flange portion 44 and the lower flange portion 48 on each other, thereby securing or improving its strength (rigidity).

Thus, cracks and breaks are suppressed or prevented from occurring in the flange portion 50, even when collision load is input to the flange portion 50 through the flange bolts 52. Moreover, the respective vehicle body front-rear direction end portions of the flange portion 50 are connected to the front cross member 47A and the rear cross member 47B (the ductile member 40 is formed with a substantially rectangular frame shape).

Thus, collision load input to one flange portion 50 is efficiently absorbed, through that flange portion 50 by and the front cross member 47A and the rear cross member 47B each configured with a substantially hat shaped cross-section, as the collision load flows onward to be received by the other flange portion 50. This enables collision load input to the flange portion 50 to be suppressed or prevented from being transmitted toward the battery frame main body 21.

Namely, the battery frame 20 enables stress load applied to the battery frame main body 21 from the respective under member 18 (flange bolts 52) through the flange portion 50 during a side-on collision of the vehicle to be reduced or eliminated. This enables cracks and breaks (damage) to be suppressed or prevented from occurring in the battery frame main body 21 during a side-on collision of the vehicle.

The fastening locations of the battery frame 20 (ductile member 40) to the fuel cell stack 70 are configured on the extension portion 47C (fastening portion 64), and on the fastening portions 66, 68 projecting out toward the vehicle body front side (the battery frame main body 21 side) from the rear cross member 47B. Namely, the fastening locations to the fuel cell stack 70 are not formed on the front cross member 47A or the rear cross member 47B that extend along the vehicle width direction.

This enables collision load to be suppressed or prevented from being directly transmitted to the respective fastening locations, even when collision load is transmitted to the front cross member 47A and the rear cross member 47B. This enables cracks and breaks to be suppressed or prevented from occurring at the respective fastening locations on the ductile member 40, and enables the fuel cell stack 70 to be suppressed or prevented from coming off the battery frame 20 (the vehicle).

Each side wall portion 47D of the lower main body portion 47 of the lower portion ductile member 46 is disposed facing the respective end face portions 38 of the core frame 30. Thus, collision load transmitted from the flange portion 50 toward the side wall portion 47D, and collision load transmitted due to the energy absorption member 90 directly contacting the side wall portion 28 of the lower frame 26 is efficiently transmitted toward the respective end face portions 38 of the core frame 30, namely, the plural rows of protruding portions 33, and is efficiently absorbed by the plural rows of protruding portions 33.

Namely, the battery frame 20 enables stress load applied to the battery frame main body 21 from the flange portion 50 through the side wall portion 47D, and also stress load applied to the battery frame main body 21 (lower frame 26) from the energy absorption member 90 through the side wall portion 28 (and the side wall portion 47D) during a side-on collision of the vehicle to be reduced or eliminated.

This enables cracks and breaks (damage) to be further suppressed or prevented from occurring in the battery frame main body 21 (lower frame 26) during a side-on collision of the vehicle. This enables collision load to be suppressed or prevented from being input to the fuel cell stack 70 (the fuel cell stack 70 being damaged).

Note that, since the ductile member 40 (lower portion ductile member 46) is formed in a substantially rectangular frame shape (closed ring shape), even in cases in which the vehicle has been involved in a front-end collision or rear-end collision, the collision load is efficiently absorbed by the ductile member 40 (the side wall portions 47D of the lower main body portion 47 of the lower portion ductile member 46). There is also no fastening location to the fuel cell stack 70 formed to the side wall portions 47D.

Thus, even when collision load is transmitted to the side wall portions 47D, the collision load can be suppressed or prevented from being directly transmitted at the fastening locations. This enables cracks and breaks to be suppressed or prevented from occurring at the respective fastening locations on the ductile member 40, and enables the fuel cell stack 70 to be suppressed or prevented from coming off the battery frame 20 (the vehicle) during a front-end collision or a rear-end collision of the vehicle.

When load has been input to the battery frame 20 from the vehicle body lower side by impinging obstacles on the road surface, stress load toward the vehicle body upper side occurs in the battery frame main body 21. However, since the battery frame main body 21 includes the core frame 30 with a corrugated shape (an undulating cross-section as viewed from the vehicle width direction), strength (rigidity) against this stress load is secured or improved.

Thus, cracks and breaks (damage) can be suppressed or prevented from occurring in the battery frame main body 21, even when load is input from the vehicle body lower side. This enables the battery frame 20 to be suppressed or prevented from coming off the lower face side of the floor panel 12 (the under members 16, the under members 18, and the under brackets 17), and also enables the fuel cell stack 70 to be suppressed or prevented from coming off the battery frame 20 (the vehicle).

Namely, in the battery frame 20 according to the present exemplary embodiment, when load is input to the vehicle not only from the vehicle width direction, but also from the vehicle front-rear direction or the vehicle body lower direction, the battery frame 20 can be suppressed or prevented from coming off the floor panel 12, and the fuel cell stack 70 can be suppressed or prevented from coming off the battery frame 20 (the vehicle).

In the battery frame 20 according to the present exemplary embodiment, the battery frame main body 21 is molded in fiber reinforced plastic (FRP) material, and the ductile member 40 formed of high tensile steel sheet or ultra-high tensile steel sheet is integrally provided so as to surround the battery frame main body 21, thereby achieving an efficient reduction in weight, while securing the strength (rigidity) as the battery frame 20. This enables a reduction in fuel efficiency performance to be suppressed in vehicles equipped with the battery frame 20 according to the present exemplary embodiment.

The battery frame 20 and vehicle battery mounting structure 10 according to the present exemplary embodiment have been explained above based on the drawings; however, the battery frame 20 and vehicle battery mounting structure 10 according to the present exemplary embodiment are not limited to those in the drawings, and design modifications may be applied as appropriate within a range not departing from the spirit of the present invention. For example, the lower frame 26 may also be configured disposed inside the lower portion ductile member 46, in which case the entire battery frame main body 21 is surrounded by the ductile member 40.

The flange portion 50 of the ductile member 40 is not limited to a configuration of being fastened and fixed to the under member 18 that is joined and fixed to the lower face of the floor panel 12, and may, for example, be configured fastened and fixed by a bracket, not illustrated in the drawings, that is joined and fixed to the lower face of the floor panel 12 and the lower face of the under member 18. Namely, the flange portion 50 of the ductile member 40 may be configured indirectly joined to the floor panel 12 and the under member 18.

The fastening portion 64 may jut out toward the battery frame main body 21 side with respect to the battery frame 20 of the fuel cell stack 70 (the ductile member 40), and the respective fastening portions 66, 68 may jut out at the opposite side to the battery frame main body 21. Namely, the respective fastening portions 64, 66, 68 may all jut outward toward the battery frame main body 21 side, or may all jut out toward the opposite side to the battery frame main body 21.

The front cross member 47A and the rear cross member 47B are not limited to being configured formed with substantially hat shaped cross-sections. In the present exemplary embodiment, "fastening" is not limited to fastening by bolts (flange bolts 52) and nuts (weld nuts 54), and configuration may be made by fastening (attaching) using other fasteners (not illustrated in the drawings).

The ductile member 40 is not limited to be being formed of high tensile steel sheet or ultra-high tensile steel sheet, and may, for example, be formed of aluminum alloy, steel, or the like with a certain degree of hardness. The battery frame main body 21 is also not limited to being molded in fiber reinforced plastic (FRP) material.

The battery frame 20 according to the present exemplary embodiment is not limited to being a configuration that supports the fuel cell stack 70. The battery frame 20 may be configured to also support auxiliary equipment to the fuel cell stack 70 (as well as the fuel cell stack 70), for example. The fuel cell stack 70 according to the present exemplary embodiment may be configured by a secondary battery.

The disclosure of Japanese Patent Application No. 2013-267970 is incorporated in its entirety by reference herein. All cited documents, patent applications and technical standards mentioned in the present specification are incorporated by reference in the present specification to the same extent as if the individual cited document, patent application, or technical standard was specifically and individually indicated to be incorporated by reference.

The invention claimed is:

1. A battery frame comprising:
   a battery frame main body made of resin, the battery frame main body being disposed at a vehicle body lower side of a floor panel, the battery frame main body supporting a battery, the battery frame main body forming a multi-layer structure including: (i) an upper frame forming an apex portion, (ii) a lower frame forming a bottom portion, and (iii) an intermediate member provided between the upper frame and the lower frame, the intermediate member being fastened to an upper face of the lower frame and being fastened to lower face of the upper frame; and
   a ductile member made of metal, the ductile member being integrally connected to the battery frame main body by being fastened and fixed to a lower face side of the floor panel, the battery being fastened and fixed to the ductile member, the ductile member being formed in a ring shape surrounding at least the intermediate member.

2. The battery frame of claim 1, wherein the ductile member is formed in a ring shape surrounding at least part of the battery frame main body.

3. The battery frame of claim 1, wherein the intermediate member is formed with an undulating shaped cross-section as viewed from a vehicle width direction.

4. The battery frame of claim of 1, wherein a cross member extending along a vehicle width direction of the ductile member is formed with a substantially hat shaped cross-section.

5. The battery frame of claim of claim 1, wherein a fastening portion of the ductile member is formed by an inside fastening portion jutting outward towards the battery frame main body side in a plan view, the battery portion being fastened and fixed to the fastening portion.

6. The battery frame of claim of claim 1, wherein a fastening portion of the ductile member is formed by an outside fastening portion jutting outward towards an opposite side to the battery frame main body side in a plan view, the battery portion being fastened and fixed to the fastening portion.

7. The battery frame of claim of claim 1, wherein:
   a plurality of fastening portions are provided to the ductile member, the battery portion being fastened and fixed to the fastening portions;
   at least one of the fastening portions is formed by an inside fastening portion jutting outward towards the battery frame main body side in a plan view; and
   at least one of a remaining fastening portions is formed by an outside fastening portion jutting outward towards an opposite side to the battery frame main body side in the plan view.

8. The battery frame of claim of claim 1, wherein:
   the ductile member includes an upper portion ductile member and a lower portion ductile member; and
   a flange portion configured by superimposing part of the upper portion ductile member and part of the lower portion ductile member on each other is fastened and fixed to the lower face side of the floor panel.

9. The battery frame of claim of claim 1, wherein:
   the battery frame main body is molded in a fiber reinforced plastic material; and
   the ductile member is formed of steel sheet.

10. A vehicle battery mounting structure comprising:
    the battery frame of claim 1;
    a battery fastened and fixed to the ductile member of the battery frame; and
    a floor panel having a lower face side fastened and fixed to the ductile member of the battery frame.

11. The vehicle battery mounting structure of claim 10, wherein an energy absorption member is disposed at a vehicle width direction outside of the battery frame.

12. The vehicle battery mounting structure of claim 11, wherein the energy absorption member includes:
- an inner member including a protruding portion, the inner member being disposed at the vehicle width direction inside and projecting outward towards the vehicle width direction outside; and
- an outer member, the outer member being disposed at the vehicle width direction outside of the inner member and including an indented portion admitting the protruding portion.

* * * * *